United States Patent
Qawami et al.

(10) Patent No.: US 10,948,915 B2
(45) Date of Patent: Mar. 16, 2021

(54) COMPUTER-ASSISTED OR AUTONOMOUS DRIVING VEHICLE INCIDENT MANAGEMENT METHOD AND APPARATUS

(71) Applicant: Intel Corporation, Santa Clara, CA (US)

(72) Inventors: Shekoufeh Qawami, El Dorado Hills, CA (US); Casey Baron, Chandler, AZ (US); Kooi Chi Ooi, Bukit Gambir (MY); Naissa Conde, San Jose, CA (US); Mengjie Yu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 16/118,206

(22) Filed: Aug. 30, 2018

(65) Prior Publication Data

US 2019/0049969 A1    Feb. 14, 2019

(51) Int. Cl.

| | |
|---|---|
| *G05D 1/00* | (2006.01) |
| *G07C 5/08* | (2006.01) |
| *G05D 1/02* | (2020.01) |
| *H04W 4/44* | (2018.01) |
| *G07C 5/00* | (2006.01) |
| *G06N 20/00* | (2019.01) |
| *H04W 4/46* | (2018.01) |

(52) U.S. Cl.
CPC ......... *G05D 1/0088* (2013.01); *G05D 1/0212* (2013.01); *G07C 5/0808* (2013.01); *H04W 4/44* (2018.02); *H04W 4/46* (2018.02); *G05D 2201/0213* (2013.01); *G06N 20/00* (2019.01); *G07C 5/008* (2013.01)

(58) Field of Classification Search
CPC .............. G05D 1/0088; G05D 1/0212; G05D 2201/0213; G07C 5/0808; G07C 5/008; H04W 4/46; H04W 4/44; G06N 20/00; G06N 3/08
See application file for complete search history.

(56) References Cited

U.S. PATENT DOCUMENTS

| | | | | |
|---|---|---|---|---|
| 2003/0112133 A1* | 6/2003 | Webb | ............... | G07C 5/085 340/436 |
| 2014/0306826 A1* | 10/2014 | Ricci | ............... | G08G 1/07 340/573.1 |

* cited by examiner

*Primary Examiner* — Kelly D Williams
(74) *Attorney, Agent, or Firm* — Schwabe, Williamson & Wyatt, P.C.

(57) ABSTRACT

Apparatuses, methods and storage medium associated with computer-assisted or autonomous vehicle incident management, are disclosed herein. In some embodiments, a vehicle incident management system includes a main system controller to determine whether a vehicle hosting the apparatus is involved in a vehicle incident; if so, whether another vehicle is involved; and if so, whether the other vehicle is equipped to exchange incident information; and an inter-vehicle communication subsystem to exchange incident information with the other vehicle, on determination that the vehicle is involved in a vehicle incident involving the other vehicle, and the other vehicle is equipped to exchange incident information. Other embodiments are also described and claimed.

24 Claims, 9 Drawing Sheets

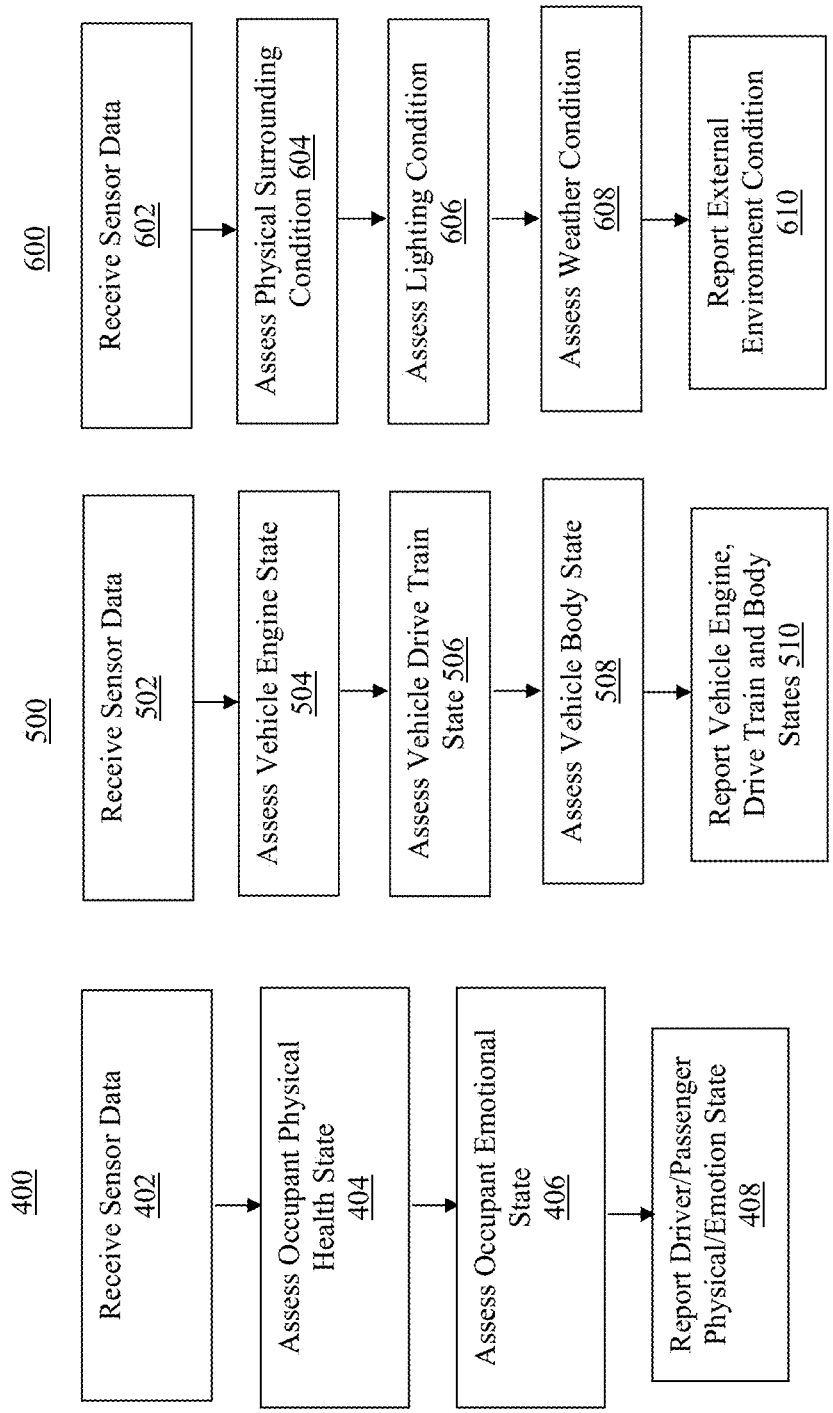

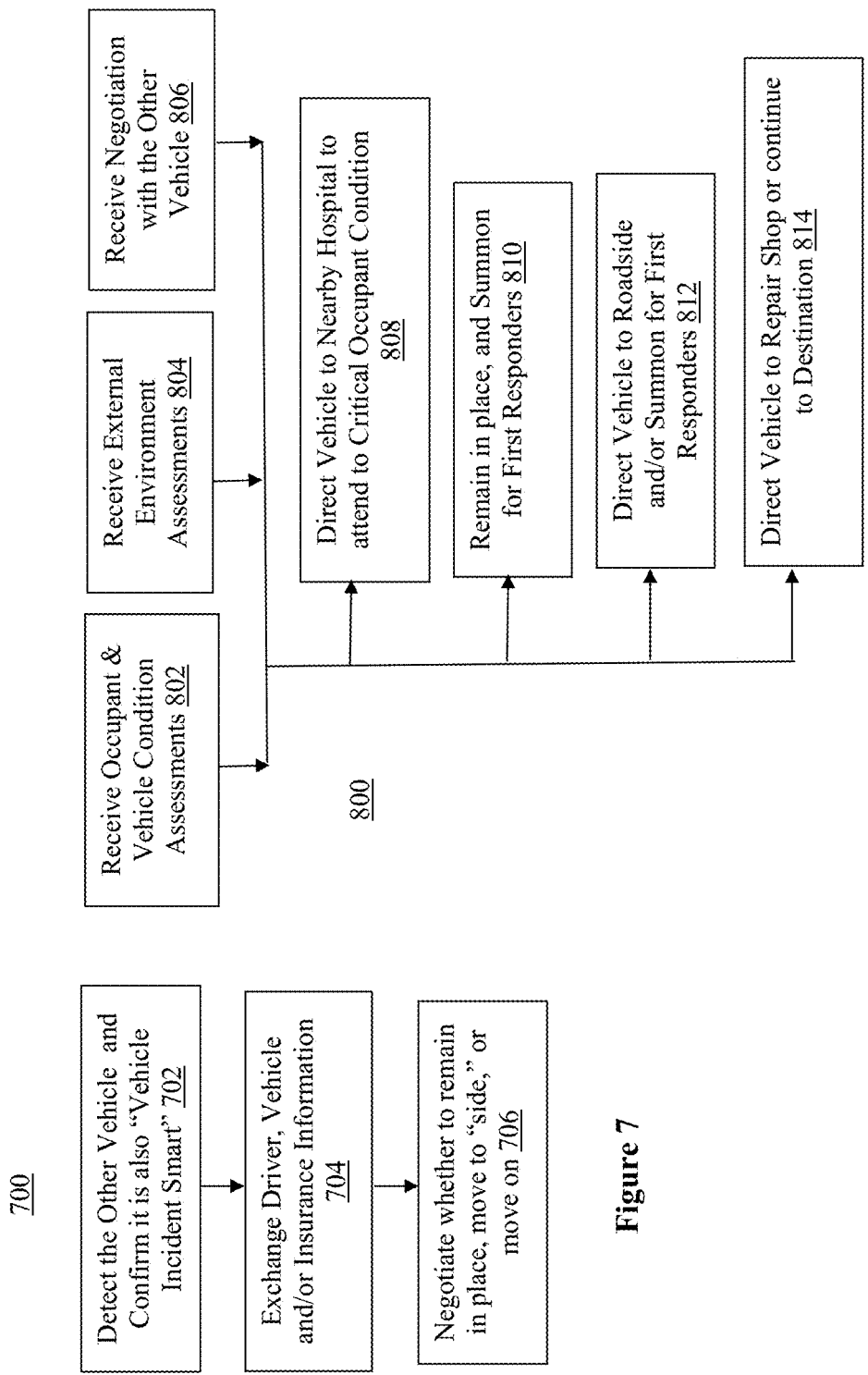

COMPUTER-ASSISTED OR AUTONOMOUS DRIVING VEHICLE INCIDENT MANAGEMENT METHOD AND APPARATUS

TECHNICAL FIELD

The present disclosure relates to the field of computer-assisted or autonomous driving (CA/AD). More particularly, the present disclosure relates to method and apparatus for managing vehicle incidents.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuits, sensors, computing and related technologies, increasingly, more and more operations of a vehicle receive computer assistance, from parallel parking, to lane changing, and so forth. Fully autonomous driving vehicles are expected to be generally available to the average consumers very soon. Notwithstanding all the advances in sensing and accident avoidance technologies, vehicle accidents or incidents are not expected to be eliminated any time soon.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates an example occupant condition assessment process, according to various embodiments.

FIG. 5 illustrates an example vehicle condition assessment process, according to various embodiments.

FIG. 6 illustrates an example surrounding area condition assessment process, according to various embodiments.

FIG. 7 illustrates an example information exchange process, according to various embodiments.

FIG. 8 illustrates an example process for determining an occupant care action and/or a vehicle action, according to various embodiments.

DETAILED DESCRIPTION

Figure 1:
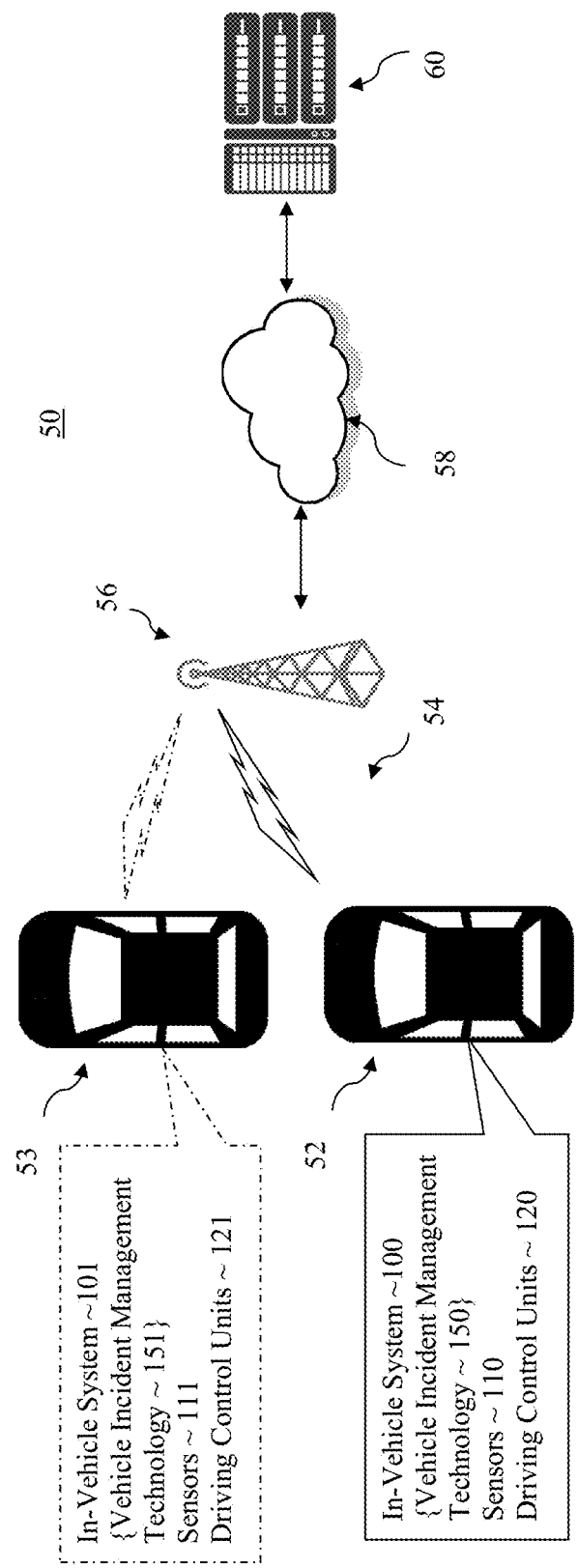
FIG. 1 illustrates an overview of an environment for incorporating and using the vehicle incident management technology of the present disclosure, in accordance with various embodiments.

To address challenges discussed in the background section, apparatuses, methods and storage medium associated with computer-assisted or autonomous driving vehicle incident management, are disclosed herein. In some embodiments, a vehicle incident management system includes a main system controller to determine whether a vehicle hosting the apparatus is involved in a vehicle incident, and if the vehicle is determined to be involved in an incident, whether another vehicle is involved; and if another vehicle is involved, whether the other vehicle is equipped to exchange incident information; and an inter-vehicle communication subsystem coupled to the main system controller to exchange incident information with the other vehicle, on determination that the vehicle is involved in a vehicle incident involving another vehicle, and the other vehicle is equipped to exchange incident information.

In some embodiments, the vehicle incident management system further includes an occupant condition assessment subsystem coupled to the main system controller to assess an occupant's physical or emotional condition, on determination that the vehicle is involved in a vehicle incident. In some embodiments, the vehicle incident management system further includes a vehicle condition assessment subsystem coupled to the main system controller to assess the vehicle's condition, on determination that the vehicle is involved in a vehicle incident. In some embodiments, the vehicle incident management system further includes an external environment assessment subsystem coupled to the main system controller to assess condition of an area surrounding the vehicle, on determination that the vehicle is involved in a vehicle incident. In some embodiments, the vehicle incident management system further includes a central communication subsystem coupled with the main system controller to report the incident to a remote server.

In some embodiments, the main system controller further determines and/or recommend an occupant caring action or a vehicle action, based at least in part on an assessment of an occupant's condition, an assessment of the vehicle's condition, an assessment of a surrounding area's condition, and/or information exchanged with the other vehicle.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the vehicle incident management technology of the present disclosure, in accordance with various embodiments, is illustrated. As shown, for the illustrated embodiments, example environment 50 includes vehicle 52 having an engine, transmission, axles, wheels and so forth. Further, vehicle 52 includes in-vehicle infotainment (IVI) system 100 having a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications. Further, IVI system 100 is provided with vehicle incident management (VIM) system/technology 150 of the present disclosure, to provide vehicle 52 with computer-assisted or autonomous management of a vehicle incident vehicle 52 is involved in.

A vehicle incident vehicle 52 is involved in, may not involve another vehicle, or it may, such as vehicle 53. In the former type of incidents, without involving another vehicle, vehicle 52 may have a flat tire, hit a barrier, slid off the roadway, and so forth. In the latter type of incidents, involving another vehicle, vehicle 52 may have a rear-end collision with another vehicle 53, head-to-head collision with the other vehicle 53 or T-boned the other vehicle 53 (or by the other vehicle 53). The other vehicle 53 may or may not be equipped with in-vehicle system 101 having similar vehicle incident management technology 151 of the present disclosure.

In some embodiments, VIM system 150/151 is configured to determine whether vehicle 52/53 is involved in a vehicle incident, and if vehicle 52/53 is determined to be involved in an incident, whether another vehicle 53/52 is involved; and if another vehicle 53/52 is involved, whether the other vehicle 53/52 is equipped to exchange incident information. Further, VIM system 150/151 is configured to exchange incident information with the other vehicle 53/52, on determination that vehicle 52/53 is involved in a vehicle incident involving another vehicle 53/52, and the other vehicle 53/52 is equipped to exchange incident information.

In some embodiments, VIM system 150/151 is further configured to individually assess one or more occupants' respective physical or emotional conditions, on determination that vehicle 52/53 is involved in a vehicle incident. Each occupant being assessed may be a driver or a passenger of vehicle 52/53. For examples, each occupant may be assessed to determine if the occupant is critical injured and stressed, moderately injured and/or stressed, minor injuries but stressed, minor injuries and not stressed, or not injured and not stressed. In some embodiments, VIM system 150/151 is further configured to assess the vehicle's condition, on determination that the vehicle 52/53 is involved in a vehicle incident. For examples, the vehicle may be assessed to determine is severely damaged and not operable, moderately damaged but not operable, moderately damaged but operable, or minor damages and operable. In some embodiments, VIM system 150/151 is further configured to assess condition of an area surrounding vehicle 52/53, on determination that vehicle 52/53 is involved in a vehicle incident. For examples, the area surrounding vehicle 52/53 may be assessed to determine whether there is a safe shoulder area for vehicle 52/53 to safely move to, if vehicle 52/53 is operable.

Still referring to FIG. 1, vehicle 52, and vehicle 53, if involved, may include sensors 110 and 111, and driving control units 120 and 121. In some embodiments, sensors 110/111 are configured to provide various sensor data to VIM 150/151 to enable VIM 150/151 to determine whether vehicle 52/53 is involved in a vehicle incident; if so, whether another vehicle 53/52 is involved; assess an occupant's condition; assess the vehicle's condition; and/or assess the surrounding area's condition. In some embodiments, sensors 110/111 may include cameras (outward facing as well as inward facing), light detection and ranging (LiDAR) sensors, microphones, accelerometers, gyroscopes, inertia measurement units (IMU), engine sensors, drive train sensors, tire pressure sensors, and so forth. Driving control units 120/121 may include electronic control units (ECUs) that control the operation of the engine, the transmission the steering, and/or braking of vehicle 52/53.

In some embodiments, VIM system 150/151 is further configured to determine and/or recommend an occupant caring action or a vehicle action, based at least in part on the assessment(s) of the occupant(s) condition, the assessment of the vehicle's condition, the assessment of a surrounding area's condition, and/or information exchanged with the other vehicle. For examples, the occupant and/or vehicle caring actions may include immediately driving the occupant(s) to a nearby hospital, moving the vehicle to a shoulder of the roadway, and so forth. In some embodiments, VIM 150/151 may issue or cause to be issued, driving commands, to driving control units 120/121 to move vehicle 52/53 to effectuate or contribute to effectuating the occupant or vehicle care action. In some embodiments, the recommended occupant caring and/or vehicle action may be override or modified by a driver or passenger of the vehicle.

In some embodiments, IVI system 100, on its own or in response to the user interactions, may communicate or interact with one or more off-vehicle remote content servers 60, via a wireless signal repeater or base station on transmission tower 56 near vehicle 52, and one or more private and/or public wired and/or wireless networks 58. Servers 60 may be servers associated with the insurance companies providing insurance for vehicles 52/53, servers associated with law enforcement, or third party servers who provide vehicle incident related services, such as forwarding reports/information to insurance companies, repair shops, and so forth, for storage and subsequent review by law enforcement, insurance adjusters and so forth. Examples of private and/or public wired and/or wireless networks 58 may include the Internet, the network of a cellular service provider, and so forth. It is to be understood that transmission tower 56 may be different towers at different times/locations, as vehicle 52/53 en routes to its destination.

These and other aspects of VIM system 150/151 will be further described with references to the remaining Figures. For the purpose of this specification, vehicles 52 and 53 may be referred to as vehicle incident smart vehicles.

Figure 2:
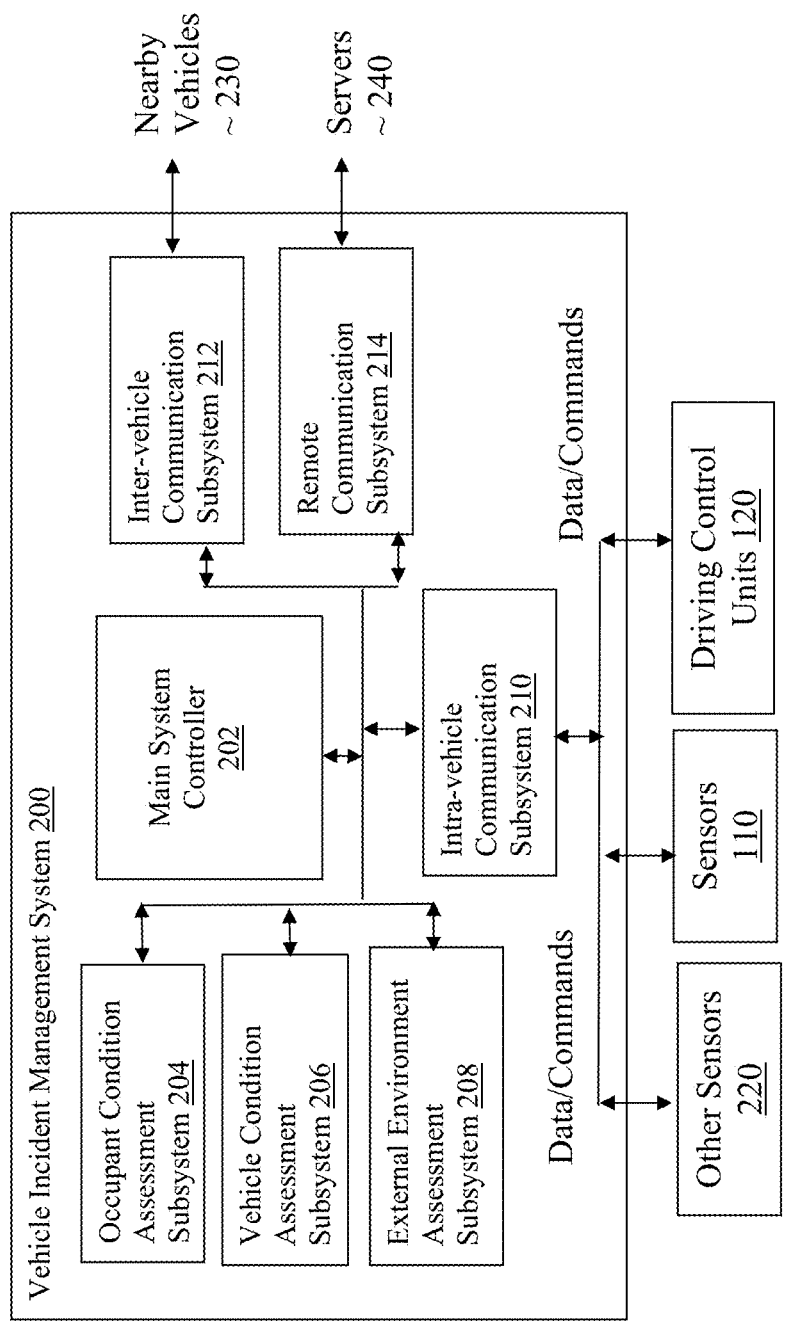
FIG. 2 illustrates a component view of an example vehicle incident management system, according to various embodiments.

Referring now to FIG. 2, wherein a component view of an example vehicle incident management system, according to various embodiments, is illustrated. As shown, for the illustrated embodiments, vehicle incident management (VIM) system 200 includes main system controller 202, occupant condition assessment subsystem 204, vehicle condition assessment 206, external environment assessment subsystem 208, intra-vehicle communication subsystem 210, inter-vehicle communication subsystem 212 and central communication subsystem 214. In other embodiments, VIM system 200 may include more or less subsystems. In some embodiments, VIM system 200 may be VIM system 150 and/or VIM system 151.

In some embodiments, main system controller 202 is configured to receive sensor data, via intra-vehicle communication subsystem 210, from sensors 110 of the vehicle, and determine whether the host vehicle (on which VIM system 200 is disposed) is involved in a vehicle incident, and if the host vehicle is determined to be involved in an incident, determine whether another vehicle is involved. The sensor data may include, but are not limited to, sensor data (images) from one or more cameras of the vehicle providing frontal, rearward and/or side world views looking out the vehicle; sensor data from accelerometer, inertia measurement units (IMU), and/or gyroscopes of the vehicle, providing speed and/or deceleration data prior to occurrence of the incident, and tilt of the vehicle after occurrence of the incident; and/or sensor data from the microphones providing audio data during occurrence of the incident.

Sensor data (images) from the one or more cameras and/or from the microphones may be processed and analyzed for object and/or sound recognitions, comparing to training set data, to determine or contribute to determining whether the host vehicle is in a vehicle incident. Sensor data from the accelerometer and/or gyroscopes of the vehicle, sensor data from inertia measurement units (IMU), and so forth, may be analyzed and compared to training set data to determine whether the host vehicle has experienced frontal, rearward or side impacts, as well as roll overs, and so forth.

In some embodiments, main system controller 202 is further configured, with the assistance of inter-vehicle communication subsystem 212, to determine whether the other vehicle is equipped to exchange incident information, if another vehicle is determined to be involved. In some embodiments, vehicles equipped with vehicle incident management technology may be configured to support inter-vehicle communication in accordance with one or more industry accepted practices. For these embodiments, main system controller 202 is further configured, with the assistance of inter-vehicle communication subsystem 212, to scan and discover whether the other vehicle supports a common inter-vehicle communication industry standard. Further, main system controller 202 may be configured, with the assistance of inter-vehicle communication subsystem 212, to authenticate the other vehicle, confirming that it can be trusted to exchange vehicle incident information, and on authentication, exchange vehicle incident information.

In some embodiments, the vehicle incident information exchanged may include driver, vehicle and evidentiary information. Driver information may include but are not limited to, driver's license information, as well as contact information (such as telephone numbers, email addresses, and so forth) of a driver of the vehicle (if any). Vehicle information may include but are not limited to, vehicle identification information, make, model, year made, as well as insurance information of the vehicle. Evidentiary information may include but are not limited to, images, traveling speed, deceleration, steering, location, and so forth, as recorded by sensors of the vehicle.

In some embodiments, the vehicle incident information may be exchanged in a secure manner, in accordance with a security protocol specified by the mutually support inter-vehicle communication standard. For example, the vehicle incident information may be encrypted prior to transmission to the other vehicle.

Continuing to refer to FIG. 2, occupant condition assessment subsystem 204 is configured, with the assistance of intra-vehicle communication subsystem 210, to receive sensor data from sensors 110 of the host vehicle, as well as sensor data collected by other sensors 220, e.g., sensors of mobile or wearable devices carried or worn by occupants of the vehicle, and to process these sensor data to assess conditions of the occupants of the vehicle. Sensor data from sensors 110 of the host vehicle may include images from inward looking cameras of the vehicle. Sensor data collected by other sensors 220, e.g., sensors of mobile or wearable devices carried or worn by occupants of the vehicle, may include electrocardiography (ECG) data collected by ECG sensors, galvanic skin response (GSR) data collected by GSR sensors and so forth. Occupant condition assessment subsystems 204 may be configured to process the images collected by inward looking camera sensors to determine whether any of the occupants are injured. Occupant condition assessment subsystems 204 may also be configured to process the ECG and GSR data to determine the health and emotional (stress) state of the occupants, including the occupants heart rate, blood pressure, stress levels and so forth.

Vehicle condition assessment subsystem 206 is configured, with the assistance of intra-vehicle communication subsystem 210, to receive sensor data from sensors 110 of the host vehicle, and to process the received sensor data to assess conditions of the vehicle. Sensor data from sensors 110 of the host vehicle may include engine sensor data collected by various engine sensors (e.g., engine temperature, oil pressure, and so forth), drive train sensor data collected by drive train sensors (e.g., transmission fluid level), vehicle body data collected by vehicle body sensors (e.g., data associated with buckling of the front grill/fenders, side doors, rear fenders, rear trunk, and so forth), tire pressure data from tire pressure sensors, and so forth. Vehicle condition assessment subsystems 206 may be configured to process these sensor data to determine whether the vehicle has suffered any damages, and if so, how severe. For example, based on the sensor data, vehicle condition assessment subsystems 206 may determine that the vehicle has not suffered any damage or suffered only minor fender bender damages. The vehicle otherwise remain operational, and fully capable of moving to the shoulder of the roadway, a nearby safe area, or continue to the original destination. On the other hand, based on the sensor data, vehicle condition assessment subsystems 206 may determine that the vehicle has suffered moderate amount of damages, but remain sufficiently operational, capable of still moving to the shoulder of the roadway. Similarly, based on the sensor data, vehicle condition assessment subsystems 204 may determine that the vehicle has suffered severe damages, no longer operational, and must remain in place.

External environment condition assessment subsystem 208 is configured, with the assistance of intra-vehicle communication subsystem 210 and/or remote communication subsystem 210, to receive sensor data from sensors 110 of the host vehicle and/or sensor data held by one or more remote servers 240, to assess conditions of an area immediate surrounding the vehicle. What constitutes the immediate surrounding area may be application dependent, varies from embodiments to embodiments. In some embodiments, the size of the immediate surrounding area assessed may be configurable by a user or the manufacturer of the vehicle. Sensor data from sensors 110 of the host vehicle may include temperature readings collected by temperature sensors of the vehicle, humidity readings collected by humidity sensors of the vehicle, lighting measurements collected by light sensors of the vehicle, rain measurements collected by rain sensors of the vehicle, images collected by the outward looking cameras of the vehicle, and so forth. Sensor data held by remote servers 240 may similarly include temperature readings, humidity readings, precipitation readings, and so forth, of the surrounding area. External environment condition assessment subsystems 208 may be configured to process these sensor data to determine whether it is raining or snowing in the area, the amount of daylight, and so forth. External environment condition assessment subsystems 208 may also be configured to process the images to determine whether the surrounding area has suffered any damages, e.g., whether there are fallen trees/utility poles, damages to barriers, vehicle debris, and so forth.

As alluded to earlier, intra-vehicle communication subsystem 210 is configured to facilitate intra vehicle communication with sensors 110 and driving control units 120 of the vehicles, as well as other sensors 220 of e.g., mobile or wearable devices carried or worn by occupants of the vehicle. More specifically, intra-vehicle communication subsystem 210 is configured to receive data from sensors 110 and driving control units 120, and transmit commands to sensors 110 and driving control units 120. Example of commands to sensors 110 may include calibration commands, or commands to collect certain sensor data that are collected on demand (as opposed to being collected continuously). Example of commands to driving control units 120 may include but are not limited to, various operation commands to driving control units 120 controlling operations of the engine, the drive train, and/or the braking system of the vehicle.

In some embodiments, intra-vehicle communication subsystem 210 may be coupled with sensors 110 and driving control units 120 via a vehicle bus. Intra-vehicle communication subsystem 210 may communicate with sensors 110 and driving control units 120 in accordance with the Controller Area Network communication protocol. In some embodiments, intra-vehicle communication subsystem 210 may be communicatively coupled with other sensors 220 via a wireless network, and communicate in accordance with a wireless network protocol, such as Near Field Communication (NFC), Bluetooth®, WiFi and so forth.

As alluded to earlier, inter-vehicle communication subsystem 212 is configured to facilitate communication with nearby vehicles 230, which may include other vehicles involved in the incident, such as vehicle 53, or other nearby vehicle incident smart vehicles who witnessed the incident. In some embodiments, inter-vehicle communication subsystem 212 is configured to support inter-vehicle communication in accordance with one or more industry accepted practices. In some embodiments, inter-vehicle communication subsystem 212 may be configured to communicate with communication subsystems of the other vehicles via WiFi or cellular, such as LTE 4G/5G.

As alluded to earlier, remote communication subsystem 214 is configured to facilitate communication with one or more remote servers 240, which may be server 60 of FIG. 1. As described earlier, remote servers 240 may be a server affiliated with an insurance company, a server associated with law enforcement, a server affiliated with a third party vehicle incident service, a server affiliated with an environmental data service, and so forth. In some embodiments, remote servers 240 may also be a server associated with first responders, fire, ambulance, and so forth. In some embodiments, remote communication subsystem 214 may be configured to communicate with servers 240 wirelessly, via a wide area network, such as the Internet. Wireless communication may be WiFi or cellular, such as LTE 4G/5G.

In some embodiments, main system controller 202 is further configured to receive assessments of occupants' physical or emotional condition, e.g., from occupant condition assessment subsystem 204, assessments of the vehicle's condition, e.g., from vehicle condition assessment subsystem 206, and assessments of the condition of the immediate surrounding area, e.g., from external environment assessment subsystems 208, process these assessments, and determine an occupant care action and/or a vehicle care action, based at least in part on these assessments. For example, if one of the occupant is determined to be in critical condition, and the vehicle is determined to be operable, main system controller 202 may determine an occupant/vehicle care action to direct the vehicle to drive to a nearby hospital, so the occupant can be medically attended to. As another non-limiting example, if the occupants are determined to be in relative good condition, and the vehicle is determined to be inoperable or the external environment is not sufficiently safe for the vehicle to move, main system controller 202 may determine an occupant/vehicle care action to direct the vehicle to remain in place and summon first responders.

As still another non-limiting example, if the occupants are determined to be in relative good condition, the vehicle is determined to be operable, and the external environment is sufficiently safe for the vehicle to move, main system controller 202 may determine an occupant/vehicle care action to direct the vehicle to move the vehicle to the shoulder of the roadway, or otherwise a safe area, and summon first responders. As still another non-limiting example, if the occupants are determined to be in relative good condition, the vehicle is determined to be operable, and the external environment is sufficiently safe for the vehicle to move, main system controller 202 may determine an occupant/vehicle care action to direct the vehicle to drive the vehicle to a nearby repair shop or simply continue on to the destination.

Figure 9:
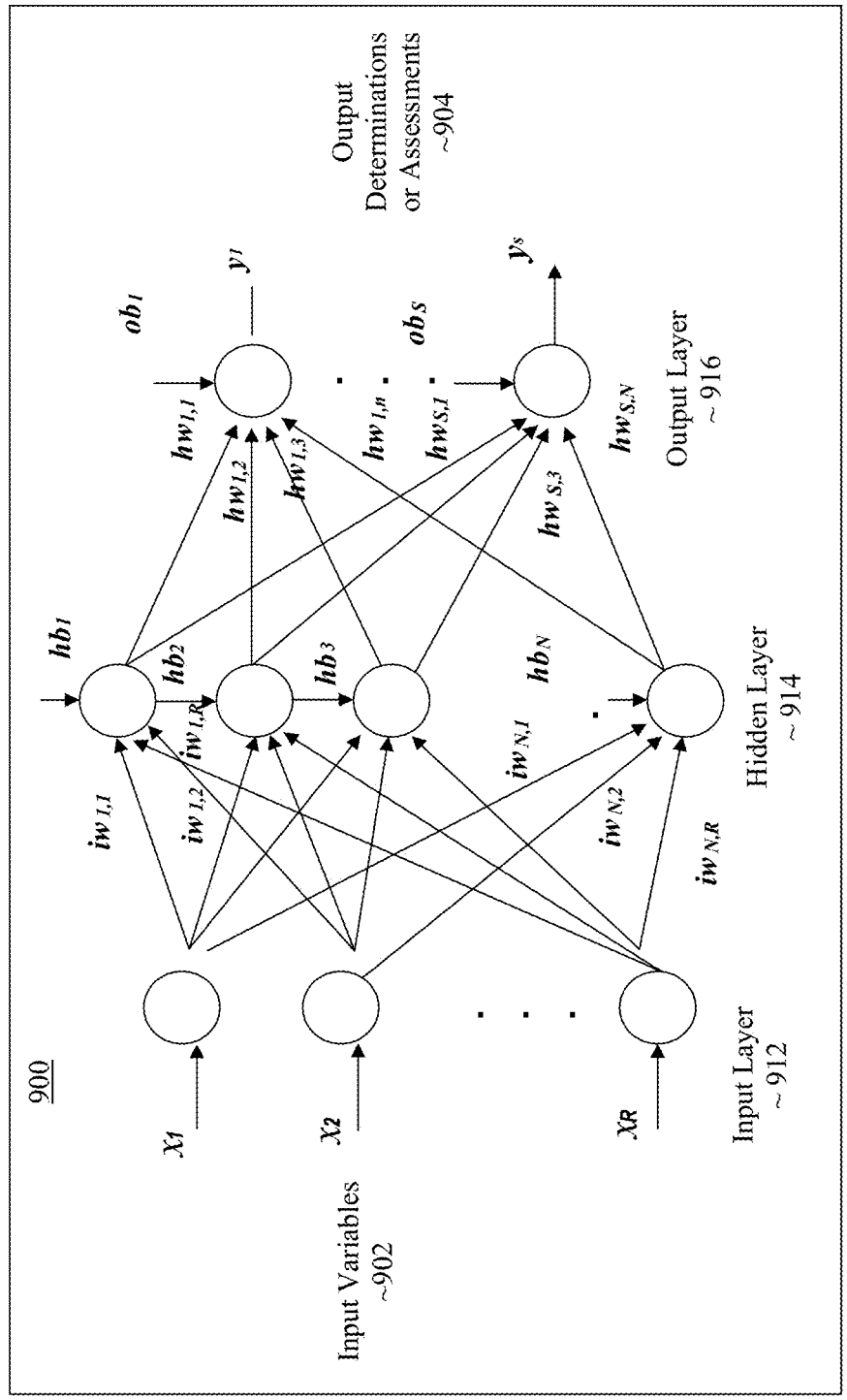
FIG. 9 illustrates an example neural network suitable for use with present disclosure, according to various embodiments.

In some embodiments, each of main system controller 202, occupant condition assessment subsystem 204, vehicle condition assessment subsystem 206, and/or external environment assessment subsystem 208 may include one or more trained neural networks in performing its determinations and/or assessments. FIG. 9 illustrates an example neural network, in accordance with various embodiments. As shown, example neural network 900 may be a multilayer feedforward neural network (FNN) comprising an input layer 912, one or more hidden layers 914 and an output layer 916. Input layer 912 receives data of input variables (x) 902.

Hidden layer(s) 914 processes the inputs, and eventually, output layer 916 outputs the determinations or assessments (y) 904. In one example implementation the input variables (x) 902 of the neural network are set as a vector containing the relevant variable data, while the output determination or assessment (y) 904 of the neural network are also as a vector.

Multilayer feedforward neural network (FNN) may be expressed through the following equations:

$$ho_i = f\left(\sum_{j=1}^{R} (Iw_{i,j} x_j) + hb_i\right), \text{ for } i = 1, \ldots, N$$

$$y_i = f\left(\sum_{k=1}^{N} (hw_{i,k} ho_k) + ob_i\right), \text{ for } i = 1, \ldots, S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \sum_{k=1}^{m} (E_k), \text{ where } E_k = \sum_{p=1}^{S} (t_{kp} - y_{kp})^2$$

where $y_{kp}$ and $t_{kp}$ are the predicted and the target values of pth output unit for sample k, respectively, and m is the number of samples.

In some embodiments, main system controller 202 may include a pre-trained neural network 900 to determine whether the vehicle is not involved in a vehicle incident, involved in a vehicle incident without another vehicle, or involved in a vehicle incident with at least one other vehicles. The input variables (x) 902 may include objects recognized from the images of the outward facing cameras, and the readings of the various vehicles sensors, such as accelerometer, gyroscopes, IMU, and so forth. The output variables (y) 904 may include values indicating true or false for vehicle not involved in a vehicle incident, vehicle involved in a vehicle incident not involving another vehicle and vehicle involved in a vehicle involving at least one other vehicles. The network variables of the hidden layer(s) for the neural network of main system controller 202 for determining whether the vehicle is involved in an incident, and whether another vehicle is involved, are determined by the training data.

In some embodiments, occupant assessment subsystem 204 may include a pre-trained neural network 900 to assess condition of an occupant. The input variables (x) 902 may include objects recognized in images of the inward looking cameras of the vehicle, sensor data, such as heart rate, GSR readings from sensors on mobile or wearable devices carried or worn by the occupant. The output variables ($y_i$) 904 may include values indicating selection or non-selection of a condition level, from healthy, moderately injured to severely injured. The network variables of the hidden layer(s) for the neural network of occupant assessment subsystem 204 are determined by the training data.

In some embodiments, vehicle assessment subsystem 206 may include a trained neural network 900 to assess condition of the vehicle. The input variables ($x_i$) 902 may include objects recognized in images of the outward looking cameras of the vehicle, sensor data, such as deceleration data, impact data, engine data, drive train data and so forth. The output variables ($y_i$) 904 may include values indicating selection or non-selection of a condition level, from fully operational, partially operational to non-operational. The network variables of the hidden layer(s) for the neural network of vehicle assessment subsystem 206 are determined by the training data.

In some embodiments, external environment assessment subsystem 208 may include a trained neural network 900 to assess condition of the immediate surrounding area of the vehicle. The input variables ($x_i$) 902 may include objects recognized in images of the outward looking cameras of the vehicle, sensor data, such as temperature, humidity, precipitation, sunlight, and so forth. The output variables ($y_i$) 904 may include values indicating selection or non-selection of a condition level, from sunny and no precipitation, cloudy and no precipitation, light precipitation, moderate precipitation, and heavy precipitation. The network variables of the hidden layer(s) for the neural network of external environment assessment subsystem 208 are determined by the training data.

In some embodiments, main system controller 202 may further include another trained neural network 900 to determine an occupant/vehicle care action. The input variables ($x_i$) 902 may include various occupant assessment metrics, various vehicle assessment metrics and various external environment assessment metrics. The output variables ($y_i$) 904 may include values indicating selection or selection for various occupant/vehicle care actions, e.g., drive occupant to nearby hospital, move vehicle to roadside and summon first responders, stay in place and summon first responders, or continue onto repair shop or destination. Similarly, the network variables of the hidden layer(s) for the neural network of main system controller 202 for determining occupant and/or vehicle care action are also determined by the training data.

In the example of FIG. 9, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Still referring to FIG. 2, In some embodiments, each of main system controller 202, occupant condition assessment subsystem 204m, vehicle condition assessment subsystem 206, external environment assessment subsystem 208, intra-vehicle communication subsystem 210, inter-vehicle subsystem 212, and remote communication subsystem 214 may be implemented in hardware, software or combination thereof. Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, especially those embodiments where either controller 202 or one of subsystems 204-208 includes at least one neural network, at least a portion of controller 202 and subsystem 204-208 may be implemented in an accelerator. One example software architecture and an example hardware computing platform will be further described later with references to FIGS. 10 and 11.

Figure 3:
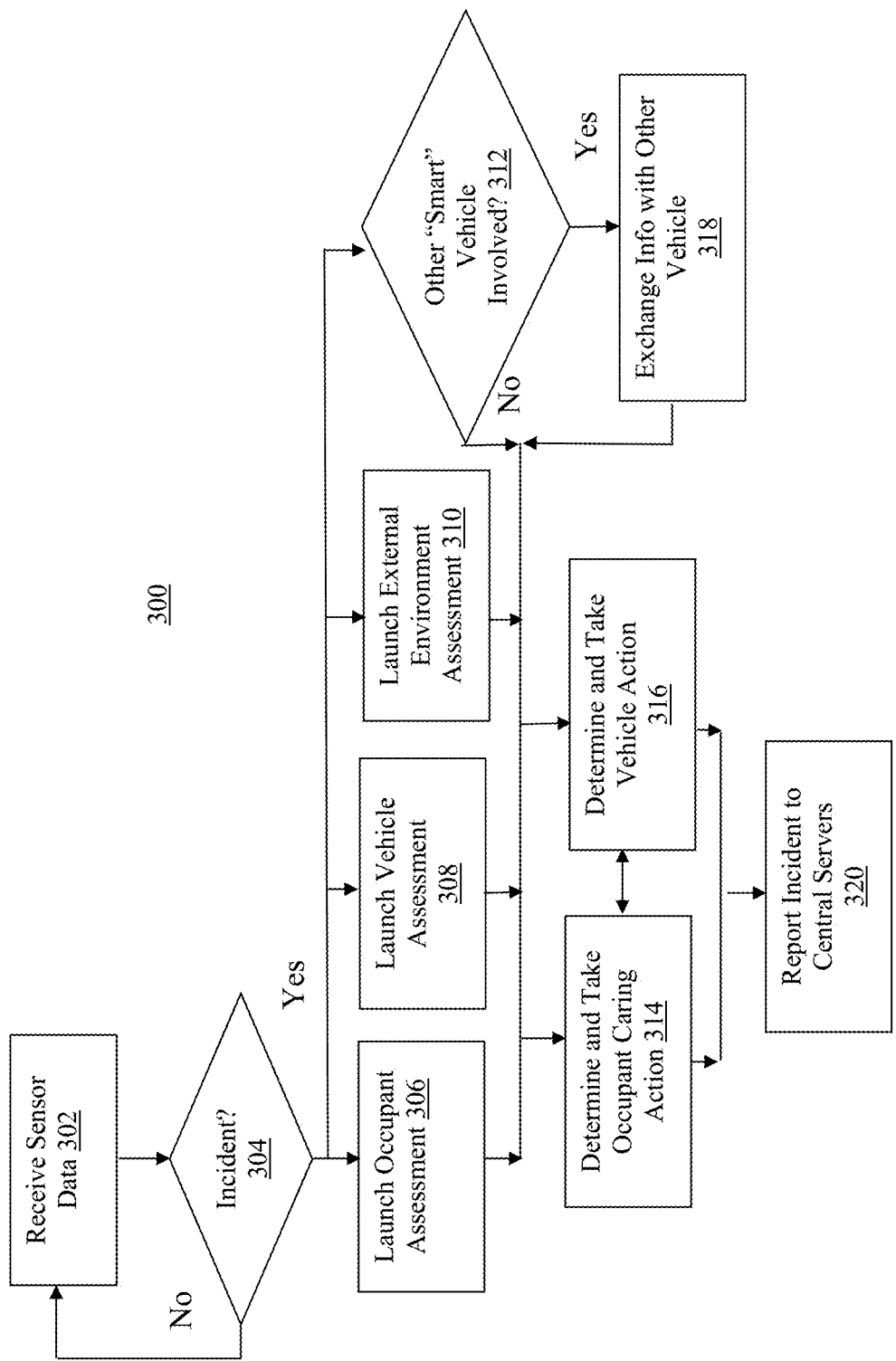
FIG. 3 illustrates an example vehicle incident management process, according to various embodiments.

Referring now to FIG. 3, wherein an example vehicle incident management process, according to various embodiments, is illustrated. As shown, for the embodiments, process 300 for managing vehicle incidents include operations performed at blocks 302-320. In some embodiments, the various operations may be performed by the various controller and subsystems 202-210 of VIM system 200 of FIG. 2. In alternate embodiments, there may be additional operations or some of the operations may be performed in different order.

Process 300 may start at block 302. At block 302, sensor data about a vehicle are received from various sensors. Next, at block 304, a determination is made on whether the vehicle is involved in an incident. The determination may be made based at least in part on the sensor data received. If a result of the determination is negative (No branch), the vehicle is not involved in an incident, process 300 returns to block 302 and continues therefrom as earlier described. If a result of the determination is positive (Yes branch), the vehicle is involved in an incident, process 300 proceeds to blocks 306-312.

At block 306, a process to assess the conditions of occupants of the vehicle may be initiated. The conditions of occupants of the vehicle may be assessed based at least in part on the sensor data received, as well as additional sensor data collected by mobile devices or wearable devices carried or worn by the occupants. On completion of the assessment, from block 306, process 300 may proceed to blocks 314 and 316. An example process to assess the condition of an occupant will be further described below with references to FIG. 4.

At block 308, a process to assess the condition of the vehicle may be initiated. The condition of the vehicle may be assessed based at least in part on the sensor data received. On completion of the assessment, from block 308, process 300 may proceed to blocks 314 and 316. An example process to assess the condition of the vehicle will be further described below with references to FIG. 5.

At block 310, a process to assess the condition of an external area immediately surrounding the vehicle may be initiated. The conditions of an external area immediately surrounding the vehicle may be assessed based at least in part on the sensor data received, as well as other sensor data retrieved from remote environmental data repositories. On completion of the assessment, from block 310, process 300 may proceed to blocks 314 and 316. An example process to assess the condition of an external area immediately surrounding the vehicle will be further described below with references to FIG. 6.

At block 312, a determination may be made on whether the vehicle incident involves at least one other vehicle. The determination may be made based at least in part on the sensor data received. If a result of the determination is negative (No branch), no other vehicle is involved in the incident, process 300 may proceed to block 314 and 316. If a result of the determination is positive (Yes branch), at least one other vehicle is involved in an incident, process 300 may first proceed to block 318 before proceeding to blocks 314-316. At block 318, incident information, such as driver, vehicle and/or evidentiary information may be exchanged with the other vehicles, who are also involved in (or witnessed) the vehicle incident (if the other vehicles are capable of such automated exchange). An example process to exchange vehicle incident information with other involved vehicles will be further described below with references to FIG. 7.

At blocks 314-316, determinations and/or recommendation may be made on whether one or more occupant caring and/or vehicle caring actions should be taken, and if so, identify the occupant caring and/or vehicle caring actions to be taken And if a result of the determinations indicate and identify occupant caring and/or vehicle caring actions to be taken or recommended, the identified occupant caring and/or vehicle caring actions are recommended, taken or caused to be taken. In some embodiments, the determined/recommended actions may be subject to the approval and/or modification of an occupant of the vehicle. An example process to determine and identify one or more client caring and/or vehicle caring actions will be further described below with references to FIG. 8.

From blocks 314-316, process 300 proceed to block 320. At block 320, information related to the incident may be reported to a central server, which may be associated with e.g., an insurance provider, a repair service provider, and so forth. The reported information may be stored with the central server for subsequent review by e.g., law enforcement, insurance adjusters, and so forth.

Referring now to FIG. 4, wherein an example occupant condition assessment process, according to various embodiments, is shown. As shown, for the embodiments, process 400 for assessing the condition of an occupant includes operations performed at blocks 402-408. In some embodiments, the various operations may be performed by e.g., the occupant condition assessment subsystem 204 of VIM system 200 of FIG. 2. In alternate embodiments, there may be additional operations or some of the operations may be performed in different order.

Process 400 may start at block 402. At block 402, sensor data collected by sensors of the vehicle, as well as sensor data collected by sensors of one or more mobile device or wearable device carried or worn by the occupant may be received. Next, at block 404, the occupant's physical health condition may be assessed. For examples, whether the occupant is bleeding may be determined via whether blood was recognized in the images collected by the inward facing cameras of the vehicle; whether the occupant is seriously hurt may be determined via his posture as recognized through the images collected by the inward facing cameras of the vehicle; and/or whether the occupant is in pain may be determined via his facial expression as seen through the images collected by the inward facing cameras of the vehicle or the sound collected by the microphones embedded with the vehicle.

Next, at block 406, the occupant's emotional condition may be assessed. For examples, whether the occupant is in stress may be determined via the heart rate and/or GSR readings collected the mobile device or wearable device carried or worn by the applicant, or via the facial expression as seen through the images collected by the inward facing cameras of the vehicle or the sound collected by the microphones embedded with the vehicle.

At block 408, on completion of the physical health and emotion state assessments, an assessment report may be outputted. In some embodiments where process 400 is performed by occupant condition assessment subsystem 204 of FIG. 2, the assessment report may be outputted for main system controller 202

Referring now to FIG. 5, wherein an example vehicle condition assessment process, according to various embodiments, is shown. As shown, for the embodiments, process 500 for assessing the condition of the vehicle includes operations performed at blocks 502-510. In some embodiments, the various operations may be performed by e.g., the vehicle condition assessment subsystem 206 of VIM system 200 of FIG. 2. In alternate embodiments, there may be additional operations or some of the operations may be performed in different order.

Process 500 may start at block 502. At block 502, sensor data collected by sensors of the vehicle may be received. Next, at block 504, the vehicle's engine condition may be assessed, based at least in part on the sensor data collected by engine sensors of the vehicle. Examples of sensor data collected by engine sensors of the vehicle may include but are not limited engine oil level, engine oil temperature, coolant level, coolant temperature, engine speed (revolutions per minute (rpm)), and so forth.

At block 506, the vehicle's drive train condition may be assessed, based at least in part on the sensor data collected by drive train sensors of the vehicle. Examples of sensor data collected by drive train sensors of the vehicle may include but are not limited transmission oil level, transmission oil temperature, brake fluid level, tire pressure, and so forth.

At block 508, the vehicle's body condition may be assessed, based at least in part on the sensor data collected by body sensors of the vehicle. Examples of sensor data collected by body sensors of the vehicle may include but are not limited images collected by outward facing cameras of the vehicle, level sensors embedded in the front end, front fenders, side doors, rear fenders, and rear end of the vehicle, and so forth.

At block 510, on completion of the vehicle engine, drive train and body states assessments, an assessment report may be outputted. In some embodiments where process 500 is performed by vehicle condition assessment subsystem 206 of FIG. 2, the assessment report may be outputted for main system controller 202.

Referring now to FIG. 6, wherein an example surrounding area condition assessment process, according to various embodiments, is shown. As shown, for the embodiments, process 600 for assessing the condition of the surrounding area of the vehicle includes operations performed at blocks 602-610. In some embodiments, the various operations may be performed by e.g., the external environment condition assessment subsystem 208 of VIM system 200 of FIG. 2. In alternate embodiments, there may be additional operations or some of the operations may be performed in different order.

Process 600 may start at block 602. At block 602, sensor data collected by sensors of the vehicle, as well as sensor data collected by various remote environmental data services may be received. Next, at block 604, the physical condition of the vehicle's immediate surrounding are may be assessed, based at least in part on the images collected by the outward facing cameras of the vehicle. For examples, the physical condition may be assessed based at least in part on the objects, such as debris, fallen trees, fallen utility poles, and so fort, are identified in the images collected by the outward facing cameras of the vehicle.

At block 606, the external lighting condition may be assessed, based at least in part on sensor data collected by sensors of the vehicle. Examples of sensor data collected by sensors of the vehicle may include but are not limited to, images collected by the outward facing cameras of the vehicle, daylight sensors of the vehicle, and so forth.

At block 608, the weather condition may be assessed, based at least in part on the sensor data collected by sensors of the vehicle, as well as sensor data retrieved from the remote environmental data services. Examples of sensor data collected by sensors of the vehicle may include but are not limited to exterior temperature sensed by thermostat of the vehicle, precipitation sensed by precipitation sensors of the vehicle, and so forth. Examples of sensor data retrieved from remote environmental services may include geographic terrain information, and so forth.

At block 610, on completion of the assessment of the condition of the immediate surrounding area of the vehicle, an assessment report may be outputted. In some embodiments where process 600 is performed by external environment condition assessment subsystem 208 of FIG. 2, the assessment report may be outputted for main system controller 202.

Referring now to FIG. 7, wherein an example vehicle incident information exchange process, according to various embodiments, is shown. As illustrated, example process 700 for exchanging vehicle incident information between two vehicles involved in a vehicle incident includes operations performed at blocks 702-706. In some embodiments, operations at blocks 702-706 may be performed by main system controller 202, in cooperation with inter-vehicle communication subsystem 212. In some embodiments, process 700 may include additional operations, or some of the operations may be performed in different order.

Process 700 starts at block 702. At block 702, the other vehicle involved in the vehicle incident is detected. On detection, a determination is made on whether the other vehicle is also "vehicle incident smart," i.e., whether the other vehicle is also equipped to communicate and exchange vehicle incident information, in accordance with a mutually supported communication protocol, e.g., an industry standard inter-vehicle communication protocol. In some embodiments, the determination may include authentication that the other vehicle can be trusted. On determination that the other vehicle is also "vehicle incident smart," and optionally, the other vehicle can be trusted, process 700 may proceed to block 704.

At block 704, vehicle incident information, such as driver's license (for computer-assisted, non-fully autonomous vehicles), vehicle information, insurance information, and/or evidentiary information may be exchanged. Driver license information may include driver's license number, name, address, and so forth. Vehicle information may include vehicle identification number (VIN), make, model, year and so forth. Insurance information may include insurance company name, insurance policy number, contact information, and so forth, Evidentiary information may include information potentially relevant to the determination of fault, such as images of the other vehicle captured by the outward facing cameras of the vehicle (prior to the vehicle incident), speeds and deceleration of the two vehicles as capture by the sensors of the vehicle and so forth.

Next at block 706, negotiation may be conducted with the other vehicle to reach an agreement on whether the two vehicles should remain in place, move to the side of the roadway, or move on (such as when the vehicle incident is deemed minor).

Referring now to FIG. 8, wherein an example process for determining an occupant care action and/or a vehicle action, according to various embodiments, is illustrated. As shown, for the embodiments, example process 800 for determining an occupant care action and/or a vehicle action, include operations performed at blocks 802-814. In some embodiments, the operations may be performed by main system controller 202 of VIM system 200 of FIG. 2. In other embodiments, process 800 may include additional or less operations, or with some of the operations may be performed in different order.

Process 800 starts at blocks 802, 804 and/or 806. At block 802, assessments of occupants and the vehicle conditions are received. At block 804, assessments of the condition of the immediate surrounding of the vehicle is received. At block 806, results of negotiation with the other vehicle may be optionally received. From block 802-806, process 800 may proceed to one of blocks 808-814.

At block 808, a determination to direct the vehicle to a nearby hospital to attend to an occupant in critical may be made, based at least in part on the assessments of the occupant and the vehicle's conditions. For example, the determination may be made if the occupant assessment indicates the occupant is in critical condition, and the vehicle condition assessment indicates the vehicle is sufficiently operational to get to the nearby hospital.

At block 810, a determination to remain in place, and summon for first responders may be made, based at least in part on the assessments of the occupant, the vehicle and/or the immediate surrounding's conditions, as well as a result of the negotiation with the other vehicle. For example, the determination may be made if the occupant assessment indicates the occupant is not in critical condition, the vehicle condition assessment indicates the vehicle has suffered at least moderate damages, the immediate surrounding condition is not conducive for movement of the vehicle, and/or a result of the negotiation with the other vehicle to both remain in place.

At block 812, a determination to direct the vehicle to move to the roadside, and summon for first responders may be made, based at least in part on the assessments of the occupant, the vehicle and/or the immediate surrounding's conditions, as well as a result of the negotiation with the other vehicle. For example, the determination may be made if the occupant assessment indicates the occupant is not in critical condition, the vehicle condition assessment indicates the vehicle remains operational, the immediate surrounding condition is conducive for moving the vehicle to the roadside, and/or a result of the negotiation with the other vehicle to jointly move to the roadside.

At block 814, a determination to direct the vehicle to proceed to a repair shop or the original destination, based at least in part on the assessments of the occupant, the vehicle and/or the immediate surrounding's conditions, as well as a result of the negotiation with the other vehicle. For example, the determination may be made if the occupant assessment indicates the occupant is in good condition, the vehicle condition assessment indicates the vehicle remains close to fully operational, the immediate surrounding condition is conducive for leaving the incident scene, and/or a result of the negotiation with the other vehicle to both move to.

The occupant and/or vehicle care actions in blocks 808-814 are meant to be illustrative examples, and are not meant to be limiting. Many other occupant and/or vehicle care options, based at least in part on the assessments of the occupant, the vehicle and/or the immediate surrounding's conditions, as well as a result of the negotiation with the other vehicle, are possible. Also, as noted earlier, any determined/recommended occupant and/or vehicle care action may be subject to approval and/or modification of an occupant of the vehicle.

Figure 10:
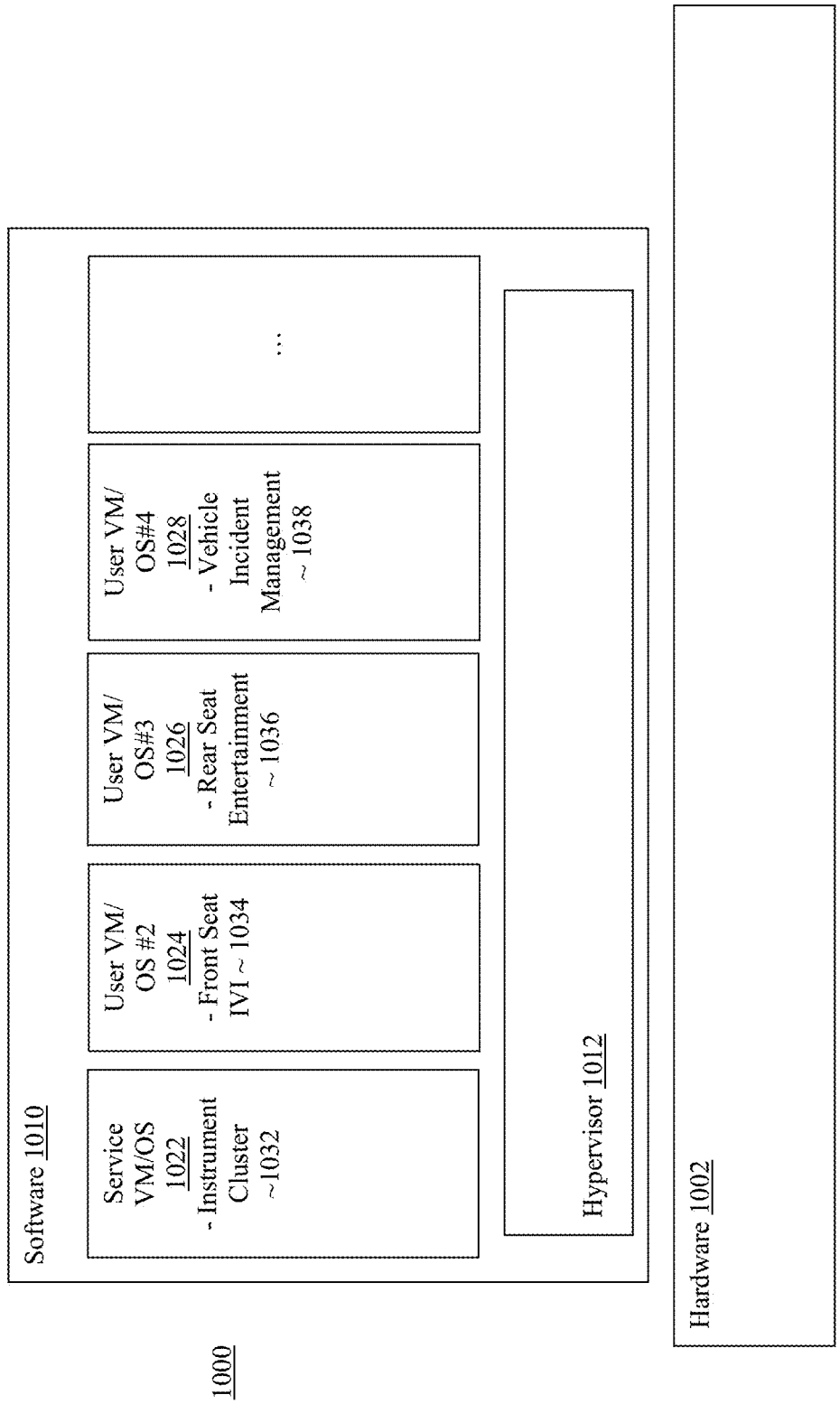
FIG. 10 illustrates a software component view of the vehicle incident management system, according to various embodiments.

Referring now to FIG. 10, wherein a software component view of the vehicle incident management system, according to various embodiments, is illustrated. As shown, for the embodiments, VIM system 1000, which could be VIM system 100, includes hardware 1002 and software 1010. Software 1010 includes hypervisor 1012 hosting a number of virtual machines (VMs) 1022-1028. Hypervisor 1012 is configured to host execution of VMs 1022-1028. The VMs 1022-1028 include a service VM 1022 and a number of user VMs 1024-1028. Service machine 1022 includes a service OS hosting execution of a number of instrument cluster applications 1032. User VMs 1024-1028 may include a first user VM 1024 having a first user OS hosting execution of front seat infotainment applications 1034, a second user VM 1026 having a second user OS hosting execution of rear seat infotainment applications 1036, a third user VM 1028 having a third user OS hosting execution of a vehicle incident management system, and so forth.

Except for vehicle incident management technology 150 of the present disclosure incorporated, elements 1012-1038 of software 1010 may be any one of a number of these elements known in the art. For example, hypervisor 1012 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 1022 and user OS of user VMs 1024-1028 may be any one of a number of OS known in the art, such as Linux, available e.g., from Red Hat Enterprise of Raliegh, N.C., or Android, available from Google of Mountain View, Calif.

Figure 11:
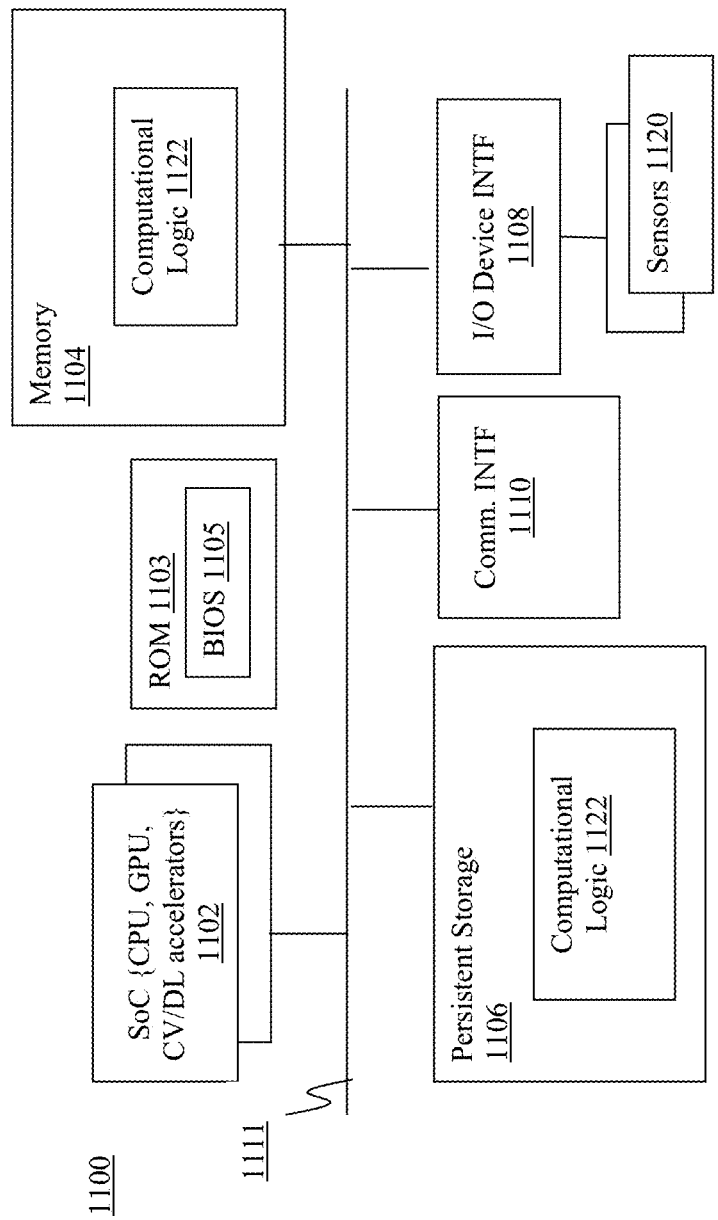
FIG. 11 illustrates a hardware component view of the vehicle incident management system, according to various embodiments.

Referring now to FIG. 11, wherein an example computing platform that may be suitable for use to practice the present disclosure, according to various embodiments, is illustrated. As shown, computing platform 1100, which may be hardware 1002 of FIG. 10, may include one or more system-on-chips (SoCs) 1102, ROM 1103 and system memory 1104. Each SoCs 1102 may include one or more processor cores (CPUs), one or more graphics processor units (GPUs), one or more accelerators, such as computer vision (CV) and/or deep learning (DL) accelerators. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1111, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 112, service/user OS of service/user VM 1022-1028, and components of VIM technology 150 (such as main system controller 202, occupant condition assessment subsystems 204, vehicle assessment subsystem 206, external environment condition assessment subsystem 208, and so forth), collectively referred to as computational logic 922. The various elements may be implemented by assembler instructions supported by processor core(s) of SoCs 1102 or high-level languages, such as, for example, C, that can be compiled into such instructions.

Figure 12:
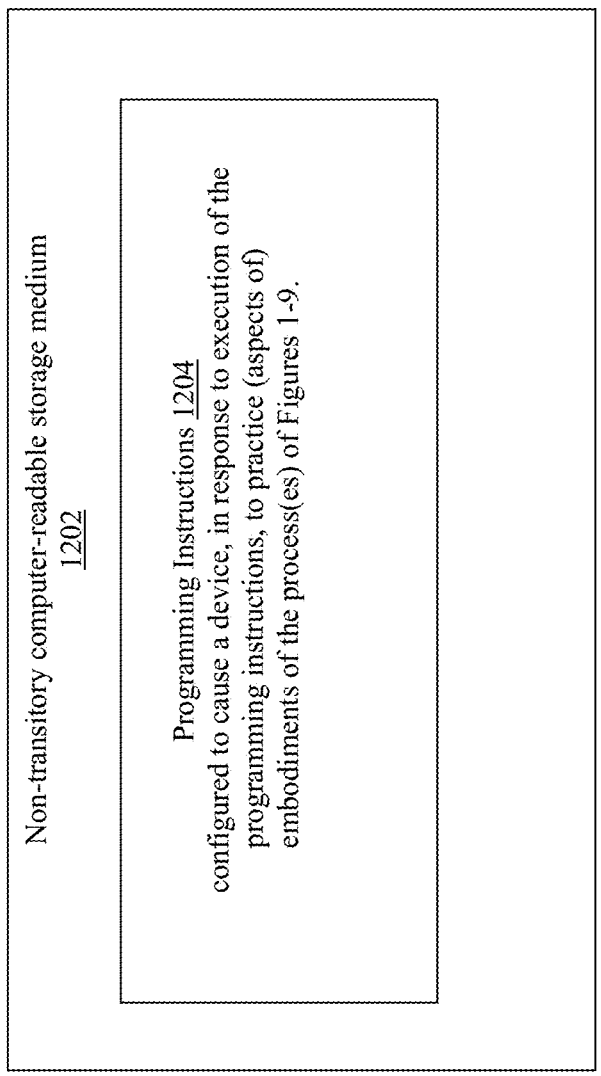
FIG. 12 illustrates a storage medium having instructions for practicing methods described with references to FIGS. 1-9, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) hypervisor 112, service/user OS of service/user VM 122-128, and components of VIM technology 150 (such as main system controller 202, occupant condition assessment subsystems 204, vehicle assessment subsystem 206, external environment condition assessment subsystem 208, and so forth) In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is an apparatus for vehicle incident management, comprising: a main system controller, disposed in a vehicle, to determine whether the vehicle is involved in a vehicle incident, and if involved in a vehicle incident, whether another vehicle is involved, and if another vehicle is involved, whether the other vehicle is equipped to exchange incident information; and an inter-vehicle communication subsystem, disposed in the vehicle and coupled with the main system controller, to exchange incident information with the other vehicle, on determination that the vehicle is involved in a vehicle incident involving another vehicle, and the other vehicle is equipped to exchange incident information.

Example 2 is example 1, wherein the main system controller is arranged to receive sensor data from a plurality of sensors of the vehicle, and determines whether the vehicle is involved in a vehicle incident, and if involved in a vehicle incident, whether another vehicle is involved, based at least in part on the sensor data received from the plurality of sensors.

Example 3 is example 1, wherein the inter-vehicle communication subsystem is arranged to detect whether the other vehicle has a communication subsystem with which the inter-vehicle communication subsystem can establish a communication channel, on determination the vehicle is involved in a vehicle incident and another vehicle is involved; and to establish a communication channel with the communication subsystem of the other vehicle, on determination that the other vehicle has a communication subsystem with which the inter-vehicle communication subsystem can establish a communication channel.

Example 4 is example 1, wherein to exchange incident information with the other vehicle includes to exchange driver, vehicle or evidentiary information.

Example 5 is example 1, wherein to exchange incident information with the other vehicle includes to negotiate with other vehicle to mutually agree to remain in place, move to another location or move on.

Example 6 is example 1, further comprising an occupant condition assessment subsystem, disposed in the vehicle and coupled to the main system controller, to assess an occupant's physical or emotional condition, on determination that the vehicle is involved in a vehicle incident.

Example 7 is example 6, wherein the occupant condition assessment subsystem is arranged to receive sensor data from a plurality of sensors of the vehicle or of a wearable device worn by the occupant, and assess the occupant's physical or emotional condition, based at least in part on the sensor data received from the plurality of sensors.

Example 8 is example 1, further comprising a vehicle condition assessment subsystem, disposed in the vehicle and coupled to the main system controller, to assess the vehicle's condition, on determination that the vehicle is involved in a vehicle incident.

Example 9 is example 8, wherein the vehicle condition assessment subsystem is arranged to receive sensor data from a plurality of sensors of the vehicle or of a wearable device worn by the occupant, and assess condition of the vehicle's engine, driving train or body, based at least in part on the sensor data received from the plurality of sensors.

Example 10 is example 1, further comprising an external environment assessment subsystem, disposed in the vehicle and coupled to the main system controller, to assess condition of an area surrounding the vehicle, on determination that the vehicle is involved in a vehicle incident.

Example 11 is example 10, wherein the external environment assessment subsystem is arranged to receive sensor data from a plurality of sensors of the vehicle or from a remote server, and assess physical, lighting or weather condition of the surrounding, based at least in part on the sensor data received.

Example 12 is example 1, wherein the main system controller is arranged to further receive assessment of an occupant, assessment of the vehicle or assessment of a surrounding area, and to determine an occupant caring action or a vehicle action, based at least in part on the received occupant assessment, vehicle assessment or surrounding area assessment.

Example 13 is example 12, wherein the main system controller is arranged to further receive incident information from the other vehicle, and to further determine the occupant caring action or the vehicle action, based on the incident information received from the other vehicle.

Example 14 is example 12, wherein the occupant caring action or the vehicle action includes one of a) direct the vehicle to a hospital to have the occupant attended to, b) remain in place and summon for first responders, c) direct the vehicle to roadside with or without summon for first responders, or d) direct vehicle to a repair shop or continue to destination.

Example 15 is example 1, wherein the apparatus further comprises an occupant condition assessment subsystem to assess an occupant's physical or emotional condition, a vehicle condition assessment subsystem, to assess the vehicle's condition, or an external environment assessment subsystem to assess condition of an area surrounding the vehicle, the respective subsystem being disposed in the vehicle and coupled to the main system controller, and the respective assessment being performed on determination that the vehicle is involved in a vehicle incident; and a computer vision or deep learning accelerator disposed in the vehicle and arranged to support of the occupant condition assessment subsystem, the vehicle condition assessment subsystem, or the external environment assessment subsystem.

Example 16 is any one of examples 1-15 further comprising a central communication subsystem, disposed in the vehicle and coupled with the main system controller, to report the incident to a remote server.

Example 17 is a method for in-vehicle computing, comprising: receiving, by an incident management system of a vehicle, from sensors of the vehicle, sensor data; determining, by the incident management system of the vehicle, whether the vehicle is involved in an incident, based at least in part on the received sensor data; and on determining the vehicle is involved in an incident, assessing, by the incident management system of the vehicle, condition of the vehicle, based at least in part on the received sensor data.

Example 18 is example 17, wherein assessing condition of the vehicle comprises assessing condition of the vehicle's engine, driving train or body, based at least in part on the sensor data received from the plurality of sensors.

Example 19 is example 17, further comprising assessing, by the incident management system, condition of an area surrounding the vehicle, on determination that the vehicle is involved in a vehicle incident.

Example 20 is example 19, wherein assessing condition of an area surrounding the vehicle comprises receiving sensor data from a plurality of sensors of the vehicle or from a remote server, and assessing physical, lighting or weather condition of the surrounding, based at least in part on the sensor data received.

Example 21 is at least one computer-readable medium (CRM) having instructions stored therein, to cause an incident management system in a vehicle, in response to execution of the instruction, to: receive sensor data from sensors of the vehicle or of a mobile or wearable device carried or worn by an occupant of the vehicle; determine whether the vehicle is involved in an incident, based at least in part on some of the received sensor data; and on determining the vehicle is involved in an incident, assess condition of an occupant, based at least in part on some of the received sensor data.

Example 22 is example 21, wherein to assess condition of an occupant comprises to assess physical or emotional condition of the occupant, based at least in part on some of the received sensor data.

Example 23 is example 21, wherein the incident management system is further caused to assess condition of the vehicle, based at least in part on some of the received sensor data.

Example 24 is example 23, wherein to assess condition of the vehicle comprises to assess condition of the vehicle's engine, driving train or body, based at least in part on some of the sensor data received from the plurality of sensors.

Example 25 is any one of examples 21-23, wherein the incident management system is further caused to determine an occupant caring action or a vehicle action, based at least in part on the assessed condition of occupant assessment, or the assessed condition of the vehicle.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for vehicle incident management, comprising:
   a main system controller, disposed in a vehicle, to determine whether the vehicle is involved in a vehicle incident, and if involved in a vehicle incident, whether another vehicle is involved, and if another vehicle is involved, whether the other vehicle is equipped to exchange incident information; and
   an inter-vehicle communication subsystem, disposed in the vehicle and coupled with the main system controller, to exchange incident information with the other vehicle, on determination that the vehicle is involved in a vehicle incident involving another vehicle, and the other vehicle is equipped to exchange incident information;
   wherein to exchange incident information with the other vehicle includes to negotiate with the other vehicle to mutually agree to remain in place, move to another location or move on.

2. The apparatus of claim 1, wherein the main system controller is arranged to receive sensor data from a plurality of sensors of the vehicle, and determines whether the vehicle is involved in a vehicle incident, and if involved in a vehicle incident, whether another vehicle is involved, based at least in part on the sensor data received from the plurality of sensors.

3. The apparatus of claim 1, wherein the inter-vehicle communication subsystem is arranged to detect whether the other vehicle has a communication subsystem with which the inter-vehicle communication subsystem can establish a communication channel, on determination the vehicle is involved in a vehicle incident and another vehicle is involved; and to establish a communication channel with the communication subsystem of the other vehicle, on determination that the other vehicle has a communication subsystem with which the inter-vehicle communication subsystem can establish a communication channel.

4. The apparatus of claim 1, wherein to exchange incident information with the other vehicle further includes to exchange driver, vehicle or evidentiary information.

5. The apparatus of claim 1, further comprising an occupant condition assessment subsystem, disposed in the vehicle and coupled to the main system controller, to assess an occupant's physical or emotional condition, on determination that the vehicle is involved in a vehicle incident.

6. The apparatus of claim 5, wherein the occupant condition assessment subsystem is arranged to receive sensor data from a plurality of sensors of the vehicle and of a wearable device worn by the occupant, and assess the occupant's physical or emotional condition, based at least in part on the sensor data received from the plurality of sensors.

7. The apparatus of claim 1, further comprising a vehicle condition assessment subsystem, disposed in the vehicle and coupled to the main system controller, to assess the vehicle's condition, on determination that the vehicle is involved in a vehicle incident.

8. The apparatus of claim 7, wherein the vehicle condition assessment subsystem is arranged to receive sensor data from a plurality of sensors of the vehicle and of a wearable device worn by the occupant, and assess a condition of the vehicle's engine, driving train or body, based at least in part on the sensor data received from the plurality of sensors.

9. The apparatus of claim 1, further comprising an external environment assessment subsystem, disposed in the vehicle and coupled to the main system controller, to assess a condition of an area surrounding the vehicle, on determination that the vehicle is involved in a vehicle incident.

10. The apparatus of claim 9, wherein the external environment assessment subsystem is arranged to receive sensor data from a plurality of sensors of the vehicle and from a remote server, and assess a physical, lighting or weather condition of the surrounding, based at least in part on the sensor data received.

11. The apparatus of claim 1, wherein the main system controller is arranged to further receive assessment of an occupant, assessment of the vehicle or assessment of a surrounding area, and to determine an occupant caring action or a vehicle action, based at least in part on the received occupant assessment, vehicle assessment or surrounding area assessment.

12. The apparatus of claim 11, wherein the main system controller is arranged to further receive incident information from the other vehicle, and to further determine the occupant caring action or the vehicle action, based on the incident information received from the other vehicle.

13. The apparatus of claim 11, wherein the occupant caring action or the vehicle action includes one of a) direct the vehicle to a hospital to have the occupant attended to, b) remain in place and summon for first responders, c) direct the vehicle to a roadside with or without summon for first responders, or d) direct the vehicle to a repair shop or continue to a destination.

14. The apparatus of claim 1, wherein the apparatus further comprises an occupant condition assessment subsystem to assess an occupant's physical or emotional condition, a vehicle condition assessment subsystem to assess the vehicle's condition, and an external environment assessment subsystem to assess a condition of an area surrounding the vehicle, the respective subsystems being disposed in the vehicle and coupled to the main system controller, and the respective assessment being performed on determination that the vehicle is involved in a vehicle incident; and a computer vision and deep learning accelerator disposed in the vehicle and arranged to support the occupant condition assessment subsystem, the vehicle condition assessment subsystem, and the external environment assessment subsystem.

15. The apparatus of claim 1, further comprising a central communication subsystem, disposed in the vehicle and coupled with the main system controller, to report the incident to a remote server.

16. A method for in-vehicle computing, comprising:
receiving, by an incident management system of a vehicle, from sensors of the vehicle, sensor data;
determining, by the incident management system of the vehicle, whether the vehicle is involved in an incident, based at least in part on the received sensor data, and if involved in an incident, whether another vehicle is involved, and if another vehicle is involved, whether the other vehicle is equipped to exchange incident information;
on determining the vehicle is involved in an incident, assessing, by the incident management system of the vehicle, a condition of the vehicle, based at least in part on the received sensor data; and
on determining another vehicle is involved, and the other vehicle is equipped to exchange incident information, exchanging, by the incident management system of the vehicle, incident information with the other vehicle;
wherein exchanging incident information with the other vehicle includes negotiating with the other vehicle to mutually agree to remain in place, move to another location or move on.

17. The method of claim 16, wherein assessing condition of the vehicle comprises assessing condition of the vehicle's engine, driving train or body, based at least in part on the sensor data received from the plurality of sensors.

18. The method of claim 16, further comprising assessing, by the incident management system, a condition of an area surrounding the vehicle, on determining that the vehicle is involved in a vehicle incident.

19. The apparatus of claim 18, wherein assessing the condition of an area surrounding the vehicle comprises receiving sensor data from a plurality of sensors of the vehicle or from a remote server, and assessing a physical, lighting or weather condition of the surrounding, based at least in part on the sensor data received.

20. At least one non-transitory computer-readable medium (CRM) having instructions stored therein, to cause an incident management system in a vehicle, in response to execution of the instruction, to:
receive sensor data from sensors of the vehicle or of a mobile or wearable device carried or worn by an occupant of the vehicle;
determine whether the vehicle is involved in an incident, based at least in part on some of the received sensor data, and if involved in an incident, whether another vehicle is involved, and if another vehicle is involved, whether the other vehicle is equipped to exchange incident information;
on determination that the vehicle is involved in an incident, assess condition of an occupant, based at least in part on some of the received sensor data; and
on determination that another vehicle is involved, and the other vehicle is equipped to exchange incident information, exchange incident information with the other vehicle;
wherein to exchange incident information with the other vehicle includes to negotiate with the other vehicle to mutually agree to remain in place, move to another location or move on.

21. The non-transitory CRM of claim 20, wherein to assess condition of an occupant comprises to assess physical or emotional condition of the occupant, based at least in part on some of the received sensor data.

22. The non-transitory CRM of claim 20, wherein the incident management system is further caused to assess a condition of the vehicle, based at least in part on some of the received sensor data.

23. The non-transitory CRM of claim 22, wherein to assess the condition of the vehicle comprises to assess a condition of the vehicle's engine, driving train or body, based at least in part on some of the sensor data received from a plurality of sensors.

24. The non-transitory CRM of claim 22, wherein the incident management system is further caused to determine an occupant caring action or a vehicle action, based at least in part on the assessed condition of occupant assessment, or the assessed condition of the vehicle.

* * * * *